Patented Apr. 16, 1929.

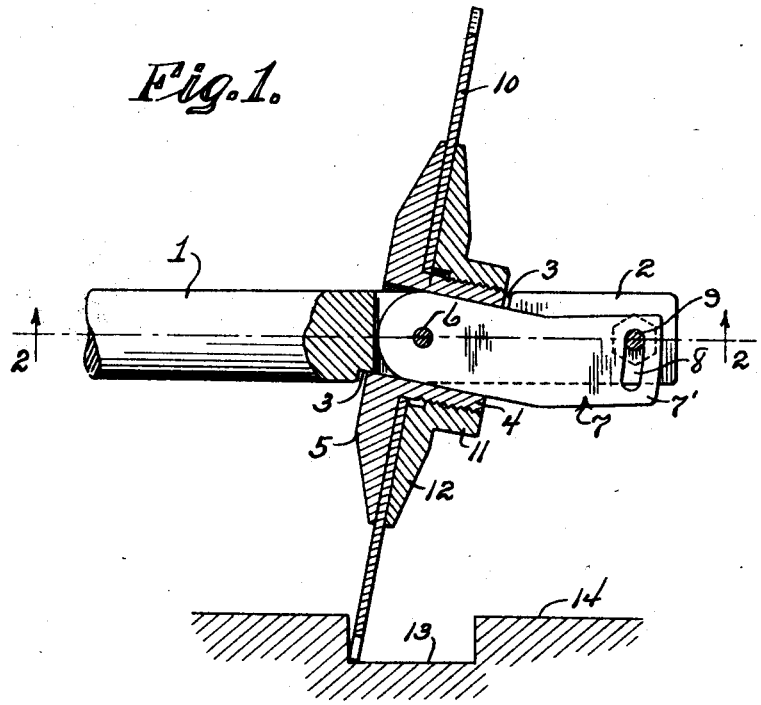
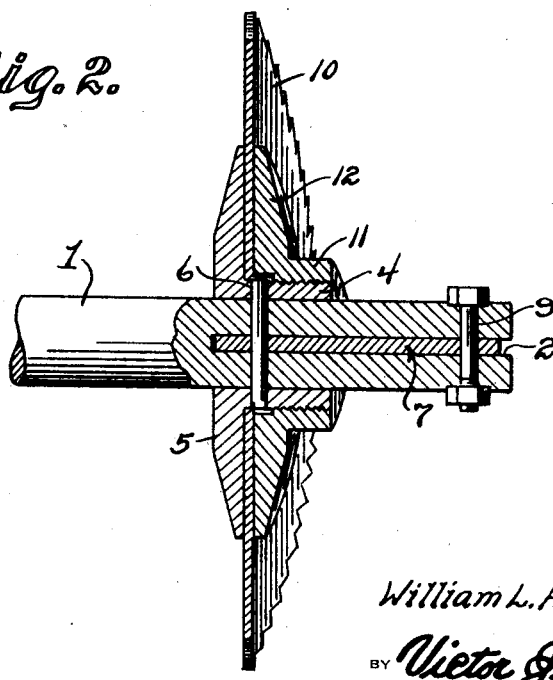

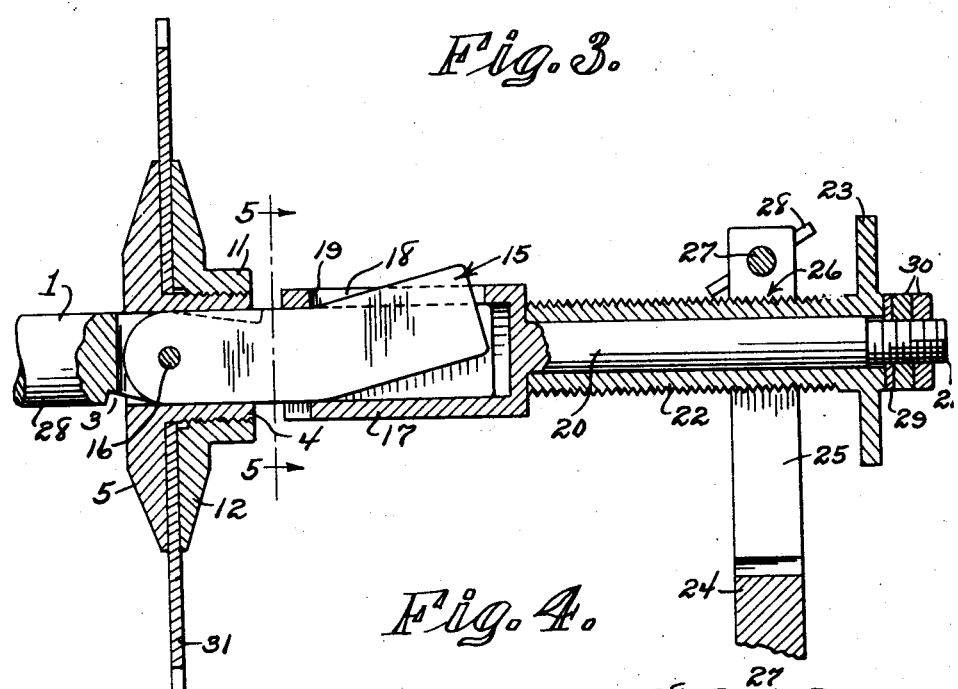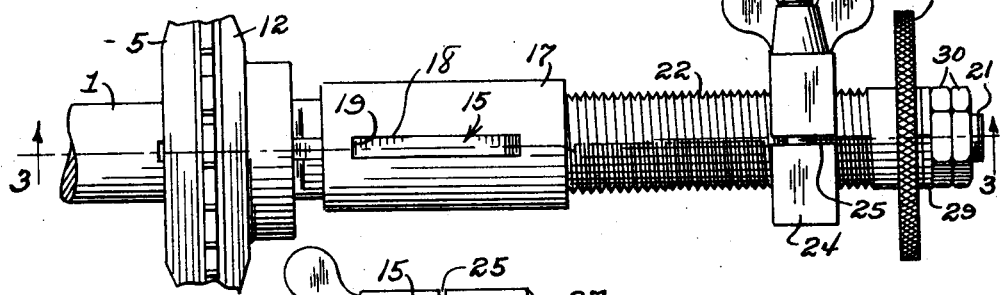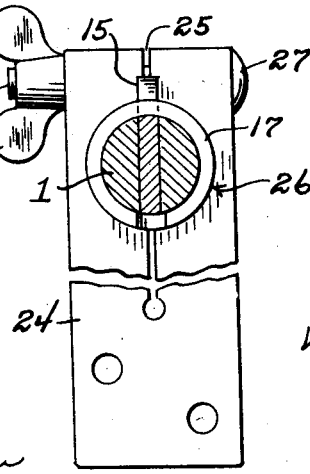

1,709,649

UNITED STATES PATENT OFFICE.

WILLIAM LEVI ADAMSON, OF OKLAHOMA CITY, OKLAHOMA, ASSIGNOR OF ONE-HALF TO ERNEST R. SCOTT, OF OKLAHOMA CITY, OKLAHOMA.

SAW HEAD.

Application filed May 19, 1928. Serial No. 279,058.

An object of this invention is the provision of a mount for a circular saw of a construction and arrangement whereby the said saw may be converted into a wobble saw, for providing boards or other material with grooves.

A further object is the provision of a mount for a circular saw that includes an element adjustable with respect to the shaft or mandrel of the saw and by virtue of such adjustment influences the saw and sustains the same at any desired angle with respect to the shaft or mandrel, and whereby the saw may be employed for straight cutting or for grooving plates or boards.

A further object is the provision of a mount for circular saws whereby the saw may be converted into a wobble saw without stopping the turning of the saw.

A still further object is the provision of a mount for circular saws that permits of the saw being easily and quickly converted into a wobble saw and likewise permits of the adjustment of the saw with respect to the groove it is to make, regardless of the width of such groove, and wherein such adjustments may be obtained without necessitating the stopping of the saw.

In the drawings:

Figure 1 is a side elevation of the improvement, parts being in section.

Figure 2 is a sectional view on the line 2—2 of Figure 1, and looking in the direction of the arrows.

Figure 3 is a sectional view approximately on the line 3—3 of Figure 4 illustrating a modification.

Figure 4 is a plan view of the construction disclosed by Figure 3.

Figure 5 is a sectional view on the line 5—5 of Figure 3.

Referring now to the drawings in detail, and to Figures 1 and 2 in particular, the numeral 1 designates a saw shaft or mandrel which, of course, is rotated in the usual manner. The shaft 1, from its outer end is centrally slotted, as at 2, and the said shaft has its opposite faces, transversely of the slot 2, notched or cut to provide angle walls 3, respectively.

Arranged on the shaft 1 and disposed over the notched portion thereof there is the hub 4 of a saw or mandrel head 5. A removable pivot 6 passes through the slotted end of the shaft 1 and through the hub 4 of the head 5, and this pivot also passes through an opening adjacent one end of a flat plate or blade 7. The plate or blade is angular in plan and the outer arm 7' thereof is provided with an elongated slot 8 that is struck from the pivot 6. Passing through the shaft 1 and through the slot 8 there is the shank 9 of a bolt. This bolt has its head partly let in one side of the shaft and its opposite end has screwed thereon a nut which is received in a depression in the opposite face of the shaft. The angle portion 7' of the plate or blade normally projects through the slot 2 of the shaft, so that by releasing the nut the operator may engage this portion of the plate and swing the same into or bring the same out of the slot 2 and thereby adjust the angular relation of the head 5 with respect to the shaft 1.

Arranged on the hub 4 of the head 1 there is a circular saw 10, and screwed on the threaded hub 4 of the head 5 there is the nut end 11 of a disc clamp 12 for the saw.

With the improvement as above described it will be noted that the saw may be sustained at a right angle on the shaft or at other angles with respect to the shaft. When the saw is disposed at a right angle it is employed as an ordinary circular saw and when arranged at other angles, is employed as a wobble saw for making grooves 13 in a board or plate 14. The width of the grooves is regulated by the adjustment of the swingable angle plate or blade 7 and the depth of the grooves is, of course, regulated by the adjustment of the bed on which the board or plate 14 rests with respect to the saw.

With a construction as above described, it is necessary to halt the turning of the saw shaft for adjusting the angle relation of the saw with respect to said shaft but in Figures 3, 4 and 5 of the drawings I have illustrated a means whereby such adjustments may be obtained without halting the turning of the saw.

In Figures 3, 4 and 5, the saw is connected to its shaft in the same manner as previously described, and the bifurcated end of the shaft has pivotally secured therein the straight end of an angle plate or blade similar to the plate 7. The blade is indicated broadly by the numeral 15, and the pivot 16 therefor is removable. The outer and angle end of the blade 15 is designed to be received in a hollow cylindrical member in the nature of a cuff 17. The cuff is formed with a longitudinal slot 18 through which the angle end of the blade 15 passes. The shoulder 19 formed at one end of the slot 18 contacts with the edge of the angle end of the blade, and to arrange the blade in the bore of the cuff the said blade is uncoupled from the saw shaft by removing the pivot 16. Thereafter the blade may be received in the bifurcated end of the saw shaft and the pivot reinserted.

The cuff 17 has what I will term its outer end closed and formed with a spindle extension 20. The spindle 20 has an outer reduced and threaded end 21. The spindle 20 is received through an elongated tubular and exteriorly threaded member in the nature of a screw box 22. The bore of the screw box is round so that the cross sectionally round spindle 20 is free to rotate therein. One end of the screw box contacts with the closed end of the cuff and the other end thereof is formed with an annular flange or enlargement whose outer edge is milled, and the said enlargement, indicated by the numeral 23, providing the operating head for the screw box.

Fixedly secured to one end of the table for the saw there is an upstanding arm 24. This arm, from its outer end, is centrally slitted, as at 25, and is formed with a transverse opening whose wall is rounded and threaded. This opening is indicated by the numeral 26, and the threads thereof coengage with the exterior threads of the screw box 22.

Passing through the slitted or bifurcated upper end of the bar 24 there is a bolt member 27. This bolt is engaged by a wing nut 28 which contacts with one side of the arm. The adjustment of the nut 28 will compress the slitted or bifurcated top portion of the arm to bind the same against the screw box and hold the latter from turning, so that the screw box provides a bearing for the spindle 20, which, of course, turns with the saw shaft 1. On the outer and threaded end 21 of the spindle 20 and contacting with the head 23 of the screw box there is a washer 29 and screwed on the said end 21 of the spindle and contacting with the washer there are lock nuts 30. These lock nuts not only hold the washer 29 against the outer and flat face of the head 23, but are employed for taking up any lost motion which may occur in the adjustment of the device or in the rotation of the spindle 20 and its cuff 17.

With this improvement it will be obvious that by merely partly unscrewing the wing nut 28 and by screwing the screw box through the arm 24, a longitudinal movement will be imparted to the cuff, so that the angle end of the plate or blade 15, riding on the shoulder 19 of the said cuff will hold the saw 31 at right angles with respect to the saw shaft or at other desired angles with respect to the said shaft, as when the saw 31 is to be converted into a wobble saw. The threads on the screw box are closely related, and the turning of the screw box will readily cause the angular adjustment of the saw on its shaft, to any desired angle even to a thousandth of an inch.

It is believed the simplicity and advantages of my invention as above described will readily present themselves to those skilled in the art so that further detailed description will not be required. Obviously I do not wish to be restricted to the precise details herein set forth and, therefore, hold myself entitled to make such changes therefrom as fairly fall within the scope of what I claim.

Having described the invention, I claim:

1. In combination, a saw carrying shaft or mandrel slotted longitudinally at the portion thereof on which a saw is arranged and notched angularly at the opposite sides of the slot, a plate received in the slot and on which the hub of the saw rests, said plate being pivoted to the shaft or mandrel and to the hub of the saw, and means for swinging the plate on its pivot and for sustaining the same in a line with or angular of the shaft or mandrel to impart a slight movement to the saw.

2. In combination, a saw shaft or mandrel having a longitudinal slot entering from one of its ends and having its opposite sides notched angularly in a line with the slot, an angle plate received in the slot, a circular saw having a hub portion disposed opposite the notches and resting on the edges of the angle plate, a pivot passing through the angle plate, the shaft or mandrel and the hub of the saw, and means for swinging the angle plate on its pivot and locking the same when so swung in the slot, to cause a like swinging of the saw for holding the saw at desired angles with respect to the shaft.

3. In combination, a saw shaft or mandrel having a longitudinal slot entering from one of its ends and having its opposite sides notched angularly in a line with the slot, an angle plate received in the slot, a circular saw having a hub portion disposed opposite the notches and resting on the edges of the angle plate, a pivot passing through the angle plate, the shaft or mandrel and the hub of the saw, means for swinging the angle plate on its pivot and locking the same when so swung in the slot, to cause a like swinging of the saw for holding the saw at desired angles with respect to the shaft, and said means influencing the plate without interfering with the free turning of the shaft or mandrel and the saw.

4. The combination with a saw shaft or mandrel, which is slotted longitudinally from one of its ends, and which has its opposite faces, in a line with the slot notched angularly, an angle plate received in the slot, a circular saw having its hub receiving the shaft or mandrel therethrough and disposed over the notched portion thereof and resting on the edges of the angle plate, a pivot passing through the hub, the shaft and the inner end of the angle plate, a rotatable element engaging with the outer angle end of the plate, a mount therefor and means for imparting a longitudinal movement to said rotatable element without influencing the turning thereof for swinging the angle plate upon its pivot to cant or incline the saw with respect to the mandrel.

5. The combination with a saw shaft or mandrel, which is slotted longitudinally from one of its ends and which has its opposite faces, in a line with the slot notched angularly, an angle plate received in the slot, a circular saw having its hub receiving the shaft or mandrel therethrough and disposed over the notched portion thereof and resting on the edges of the angle plate, a pivot passing through the hub, the shaft and the inner end of the angle plate, a slotted cuff receiving the outer end of the angle plate therein, a spindle for the cuff having an outer threaded end, a screw box in which the cuff is journaled, and said screw box having a milled head, a fixed arm which is bifurcated and which has a transverse threaded bore to engage with the threads of the screw box, adjustable means passing through the bifurcated end of the arm for adjusting the threads of the bore therein with respect to the threads of the screw box, and lock nuts on the threaded end of the spindle contacting with the headed end of the screw box.

In testimony whereof I affix my signature.

WILLIAM LEVI ADAMSON.